June 20, 1961
R. D. PERRY ET AL
2,989,316
PICK OFF CHUCK
Filed June 30, 1958
Fig.1
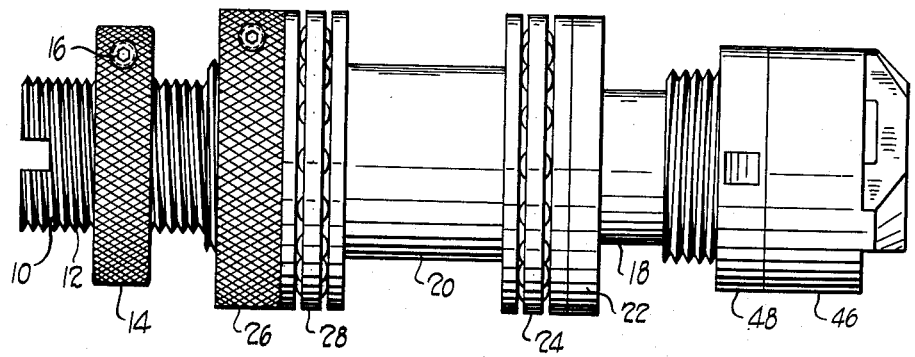
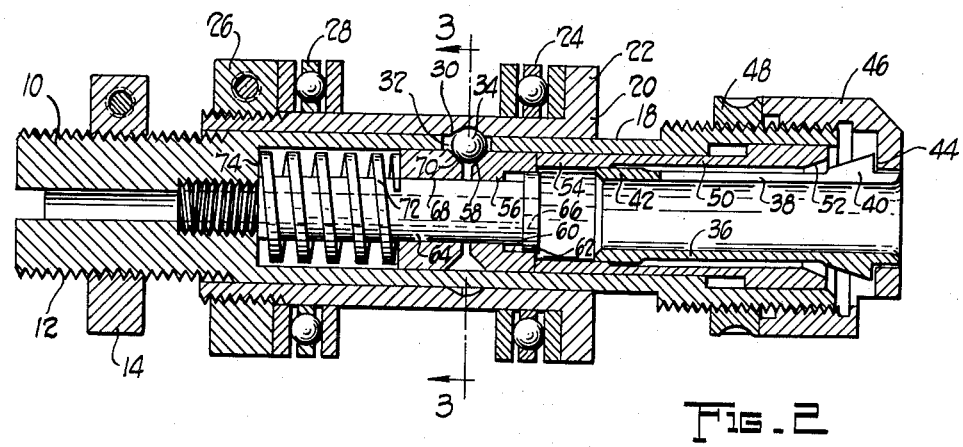
Fig.2
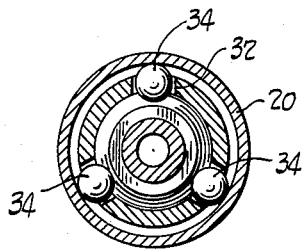
Fig.3
INVENTORS
RICHARD D. PERRY and
BY CHARLES F. ZMUGINSKY
ATTORNEY

United States Patent Office 2,989,316
Patented June 20, 1961

2,989,316
PICK OFF CHUCK
Richard D. Perry, Elyria, and Charles F. Zmuginsky, Grafton, Ohio, assignors to The Perry-Fay Company, Elyria, Ohio, a corporation of Ohio
Filed June 30, 1958, Ser. No. 745,546
5 Claims. (Cl. 279—50)

This invention relates to pick off attachments and, more particularly, to a pick off chuck which utilizes axial motion for chucking purposes.

One of the primary objects of this invention is to provide a pick off chuck, which requires only motion from a single spindle to grasp and rotate a screw machine part for chamfering, counterboring or other operations.

Standard pick off attachments operating on a spindle require that motion from a second spindle be utilized through linkage and other means to operate the chucking mechanism. This results in making a spindle unavailable for other purposes if the pick off attachment is used. For instance, in the case of a six spindle machine, only five of the spindles are available, since the sixth spindle is required to actuate the mechanism necessary for the function of the pick off chuck.

In the preferred embodiment of the invention disclosed herein, the chucking operation is accomplished by utilizing the axial movement of the spindle in relation to the frame of the machine. A pair of concentric sleeves, capable of relative longitudinal movement, operate to close the collet on the piece by such relative movement. Further, opposite movement unclamps the piece in preparation for the push off, which may be accomplished by a rod through the center of the chuck. The mechanism for operating the chuck, being entirely self-contained, a connection from one of the sleeves to the frame of the machine is all that is required for operation, thus leaving adjacent spindles free for other operations.

Accordingly, it is a further object of this invention to provide chuck mechanism wherein relative motion of sleeve members is produced by longitudinal motion of the spindle, which accomplishes chucking of the workpiece.

Another object of the invention is to provide spring means for urging the collet into contact with the workpiece in order that dimensional variations may be accommodated.

Other objects and advantages more or less ancillary to the foregoing, and the manner in which all the various objects are realized, will appear in the following description, which considered in connection with the accompanying drawings, sets forth the preferred embodiment of the invention.

In the drawings:
FIG. 1 is an outside view of the pick off chuck;
FIG. 2 is a sectional view of the pick off chuck; and
FIG. 3 is a sectional view of the pick off chuck taken along line 3—3 of FIG. 2.

In the embodiment shown in the drawings, the pick off chuck has a body 10, which is generally cylindrical and extends substantially throughout the full length of the chuck. The body 10 is threaded as at 12 in order that the chuck may be removably affixed to an automatic screw machine spindle. A lock nut 14, in engagement with the threads 12, provides necessary adjustment for positioning the chuck longitudinally in relation to the spindle mechanism. The lock nut 14 is split and a clamping action is provided by a screw 16 which holds the lock nut against rotation on the body 10.

The body 10 has an outer cylindrical surface 18 on which is slidably mounted control sleeve 20. Sleeve 20 has a flange 22 formed thereon which is engaged by a thrust bearing assembly 24.

A lock ring 26, which is threadably mounted on the sleeve 20 opposite flange 22, provides a similar abutment for engagement as a thrust bearing assembly 28. The lock ring 26 allows an adjustment of the space between the bearings 24 and 28 as required by a pillow block or other device, which surrounds control sleeve 20 and is stationary to the body of the machine. The bearings 24 and 28 provide anti-friction means for transferring longitudinal force to the sleeve 20, as required during actuation of the chuck. The inner wall of sleeve 20 has a groove 30 formed therein, the groove 30 having one side formed in approximately an arc of a circle, while the othere side is sloped to provide a gradual transition from the deepest part of the groove to the inner surface of the sleeve 20. The body 10 is perforated to provide 3 openings 32, which extend through the body 10 and receive balls 34, which are preferably made of steel.

A conventional collet 36 of a well-known tubular form split in the usual manner by longitudinal slots as indicated at 38 extend inward from its front and provide a plurality of radially movable jaws adaptable for gripping the cylindrical shank of a tool or workpiece. The collet has a conically shaped or enlarged head 40 and an integrally formed collar 42 at its rear end. The head 40 has an annular shoulder 44, which abuts against the inner surface of a cap 46, which is threadably mounted on the body 10. The jaws of the collet 36 extend through an aperture in the cap 46. A lock nut 48 is also threadably mounted on the body 10 for engagement with the cap 46 to permanently hold the cap 46 in a pre-adjusted position.

Actuating sleeve member 50 is slidably positioned between the body and the collet 36. The member 50 has a conical face 52, which co-acts with the conical surface on the head 40 of the collet 36 to urge the collet 36 into engagement with the workpiece when the member 50 is moved in a longitudinal direction toward the outer end of the collet 36. Enlarged portion 54 engages the inner cylindrical surface of the body 10 and the outer surface of the collar 42 to maintain the collet 36 in a central position during actuation. A bushing 56, also slidable in the body 10, has one end in abutment with the member 50. The end opposite to the abutting end has a conical outer wall 58, which engages the balls 34, which produces longitudinal movement of the bushing 56 when radial movement of the balls 34 occurs. A counterbore 60 in the bushing 56 receives head 62 of a stud 64, which is threaded into the body 10 and located on the center line thereof. The stud 64 is drilled to provide a bore 56 extending throughout the length thereof for accommodating a bushing rod 68. The head 62 provides a stop to prevent overtravel of the bushing 56. The second bushing 68, slidable in the body 10 and on the stud 64, has a conical surface 70 engaged by the balls 34 and is urged in a longitudinal direction by radial movement of the balls 34. A coil spring 72 is positioned around the stud 64 and has one end in engagement with the bushing 68 and the other end in engagement with the shoulder 74 on the body 10, thus producing a bias against the bushing 56 towards the balls 34.

In operation, the normal at rest position of the pick off chuck is indicated in FIG. 2. The chuck is mounted on a spindle, capable of rotation and simultaneous longitudinal movement. The pillow block affixed to a bracket mounted on the machine frame is positioned between the thrust bearings 24 and 28. As the spindle moves in either direction from the at rest position, the sleeve 20 is displaced relative to the body 10, which forces the balls 34 from the groove 30. This results in the balls moving radially between the bushings 56 and 68. Such movement of the balls 34 separates the bushings compressing spring 72 and urging sleeve member towards the head of the collet, which results in the conical surface 52 engaging the collet and forcing the collet into engagement with the workpiece. The spring 72 allows for variation in the travel of member 50, which would result from slight dimensional variations in the workpiece. The direction control sleeve 20 travels in respect to body 10 and is not critical as long as travel is sufficient to displace the groove 30 beyond the opening 32 to provide full inward travel of the balls 34. Tension of the spring 72 may be adjusted as required to provide adequate force for actuating the collet jaws. When the sleeve 20 returns to the normal position, the balls are cammed outwardly by the conical surface 70 on the bushings 56 and 68, whereupon the locking pressure is released from the collet and the workpiece falls from or is pushed from the chuck. At this point, the chuck is in position for immediate use on the following operation.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. A pick off chuck comprising a collet having jaws, a body housing said collet, a sleeve member slidable in said body and adapted for closing the collet jaws upon movement in one direction, a coil spring in said body biased toward said sleeve member, a pair of bushings intermediate said spring and said sleeve member, radially displaceable means for separating said bushings to apply the force of the spring to said collet jaws, and sliding cam means shiftable on said body for urging said radially displaceable means into engagement with and between said bushings.

2. A pick off chuck comprising a collet having jaws, a body housing said collet, a sleeve member slidable in said body and adapted for closing the collet jaws upon movement in one direction, spring means in said body biased toward said sleeve member, a pair of bushings intermediate said spring means and said sleeve member, radially displaceable means for separating said bushings to apply the force of the spring means to said collet jaws, and sliding cam means shiftable on said body for urging said radially displaceable means into engagement with and between said bushings.

3. A pick off chuck comprising a collet having jaws and a conical head formed thereon, a body housing said collet, a sleeve slidable in said body and having a conical face for closing the collet jaws upon movement in one direction, a coil spring in said body biased toward said sleeve member, a pair of bushings intermediate said spring and said sleeve, a plurality of radially displaceable balls for separating said bushings to apply the force of the spring to said collet jaws, and sliding cam means shiftable on said body for urging said radially displaceable balls into engagement with and between said bushings.

4. A pick off chuck comprising a collet having jaws, a body housing said collet, a sleeve member slidable in said body and adapted for closing the collet jaws upon movement in one direction, spring means in said body biased toward said sleeve member, a pair of bushings intermediate said spring means and said sleeve member, radially displaceable means for separating said bushings to apply the force of the spring means to said collet jaws, and a cam carried by said body for urging said radially displaceable means into engagement with and between said bushings.

5. A pick off chuck comprising a collet having jaws and a conical head formed thereon, a body housing said collet, a sleeve slidable in said body and having a conical face for closing the collet jaws upon movement in one direction, a coil spring in said body biased toward said sleeve member, a pair of bushings intermediate said spring and said sleeve, a plurality of radially displaceable balls for separating said bushings to apply the force of the spring to said collet jaws, and a cam carried by said body for urging said radially displaceable balls into engagement with and between said bushings.

References Cited in the file of this patent

UNITED STATES PATENTS

| | | |
|---|---|---|
| 2,467,569 | Walters | Apr. 19, 1949 |
| 2,475,519 | Robichaud | July 5, 1949 |
| 2,730,371 | Pulman | Jan. 10, 1956 |
| 2,735,686 | Cox | Feb. 21, 1956 |